United States Patent [19]
Copland

[11] 3,784,740
[45] Jan. 8, 1974

[54] PIPELINE INSPECTION SYSTEM

[75] Inventor: George V. Copland, Duncan, Okla.
[73] Assignee: Halliburton Company, Duncan, Okla.

[22] Filed: Aug. 23, 1972
[21] Appl. No.: 282,906

[52] U.S. Cl........ 178/6.8, 178/DIG. 1, 178/DIG. 29, 178/DIG. 39
[51] Int. Cl............................ H04n 5/19, H04n 7/18
[58] Field of Search........................ 178/6.8, DIG. 1, 178/DIG. 29, DIG. 39

[56] References Cited
UNITED STATES PATENTS

| | | | |
|---|---|---|---|
| 3,674,927 | 7/1972 | Jordan | 178/DIG. 39 |
| 3,206,547 | 11/1962 | Leitich | 178/DIG. 29 |
| 3,715,484 | 2/1973 | Latall | 178/DIG. 1 |

*Primary Examiner*—Howard W. Britton
*Attorney*—Burns, Doane, Swecker & Mathis

[57] ABSTRACT

A television inspection system for pipelines wherein the gain of the television camera and/or the camera target voltage is varied in a predetermined manner in synchronism with the scan of the television camera to compensate for nonlinear illumination of the pipeline interior.

6 Claims, 5 Drawing Figures

PIPELINE INSPECTION SYSTEM

BACKGROUND OF THE INVENTION

The present invention is directed to a pipeline inspection system and more particularly to a method and apparatus for remotely viewing the interior of a pipeline.

One practical method of visually inspecting the interior of a pipeline is to internally traverse the pipeline with a television camera and to monitor the video output signal therefrom as a remote location. The television cameras adapted for this purpose are genarally elongate in form and mounted on a frame or skid assembly in contact with the interior walls of the pipeline for centering the camera therewithin. The image displayed on the television monitor is bounded by the circular cross section of the pipeline and is essentially circular. The cameras disclosed in U. S. Pat. No. 2,852,600 to Jenkins, Jr. and U.S. Pat. No. 3,168,909 to Zurbrigen et al. issued respectively Sept. 16, 1958 and Feb. 9, 1965 are representative.

The illumination of the pipeline interior for television inspection cameras of this type is generally derived from one or more light sources mounted to the rear of the camera lens assembly and generally disposed circumferentially about the camera. The inherent light distribution pattern. pattern a lighting system of this type provides high light intensity in the immediate proximity of the camera lens and progressively less illumination toward the center of the scene viewed by the camera. Thus, the outer circumferential edges of the picture are light and the center dark. Reflectors and lens assemblies have been associated with the light sources and have provided improved lighting. Due, in part, to the limited physical dimensions of the smaller internal diameter pipelines, e.g., 4 inches, the use of reflectors has not generally been satisfactory.

The problem of light distribution within a pipeline is, moreover, accentuated by the fact that commercially available television cameras are designed to view an evenly illuminated planar scene rather than a pipeline interior which is circular and of great depth. The optimum lens setting for the best field depth is an unsatisfactory compromise due to the illumination problems.

Known prior art approaches to this problem have included the use of two television cameras focused on the same scene and scanned in synchronism where the gain of one camera is controlled by a signal representative of a spatially smoothed image from the second camera. The system disclosed in the Burson et al. U. S. Pat. No. 3,465,094 issued Sept. 2, 1969, is exemplary of this type system. The most apparent disadvantage of such systems is the requirement for two cameras, the use of which is prohibited for pipeline inspection by the physical dimensions of the smaller internal diameter pipelines.

One solution to the nonlinear illumination problem is the utilization of a variable density filter either in front of or behind the lens system of the television camera. While the center of such a filter would be clear, the energy absorbtion around the outer edges decreases the resolution of the video signal in the immediate proximity of the camera where maximum resolution is desired.

It is accordingly an object of the present invention to obviate many of the problems associated with generally known television inspection systems and to provide a novel method and apparatus for visually inspecting the interior of a pipeline.

Another object of the present invention is to provide a novel method and apparatus of modifying the amplitude of the video output signal from a television camera in accordance with predetermined illumination characteristics of the field of view.

Still another object of the present invention is to provide a novel method and apparatus for modifying the gain of a television camera in accordance with predetermined illumination characteristics of the field of view of the camera.

Yet still another object of the present invention is to provide a novel method and apparatus for compensating a television camera for the non-linear illumination characteristics of a small diameter pipeline.

A further object of the present invention is to provide a novel method and apparatus for nonlinearly modifying the target voltage and/or gain of a television camera.

These and many other objects and advantages of the present invention will be apparent from the claims and from the following detailed description when read in conjunction with the appended drawings.

THE DRAWINGS

THE DETAILED DESCRIPTION

Figure 1:
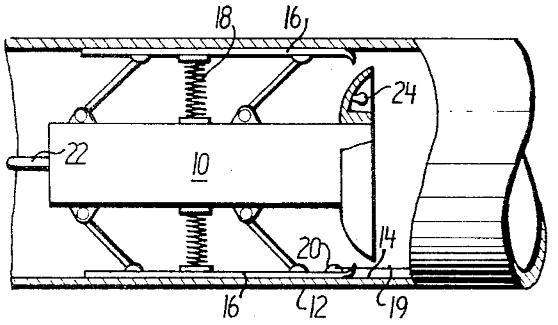
FIG. 1 is an elevation in partial section of one embodiment of the television camera of the present invention within a small diameter pipeline.

With reference now to FIG. 1, a television camera 10 is illustrated as being axially centered within a section of pipeline 12 by a suitable conventional means in contact with the internal walls 14 of the pipeline 12.

The centering means may take the form of a plurality of skids 16 circumferentially displaced and disposed radially outward of the housing of camera 10 as illustrated in FIG. 1. A coil spring 18 or other resilient means may be utilized to bias the skids 16 radially outward of the camera 10. Alternatively, rollers or other suitable conventional means may be utilized to position the camera 10 coaxially within the pipeline 12.

The camera assembly including the illustrated skids 16 may be drawn through the pipeline 12 by means of a harness 18 connected to the assembly at one or more suitable points 20. The camera 10 may be connected to a remote monitor and/or recorder by means of a conventional video cable 22 through which the power for camera operation and illumination purposes may be provided.

The illumination for the camera 10 may be provided by a lens system 24 of any suitable conventional type.

Figure 2:
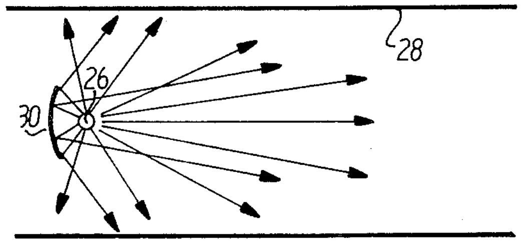
FIG. 2 is a schematic representation of the pattern of illumination derived from a light source within a pipeline.
Figure 3:
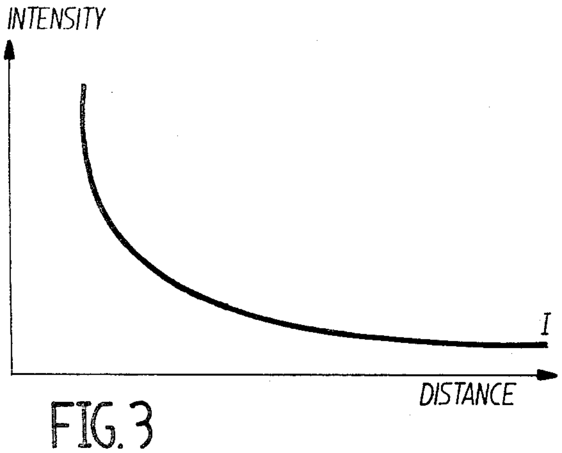
FIG. 3 is a graphical representation of the intensity of illumination of the interior walls of a pipeline from a light source disposed therein as a function of distance.

With reference now to FIG. 2, a point source 26 is illustrated on the longitudinal axis of a right circular cylinder 28. A reflector 30 is also illustrated. The illumination from the point source 26 is, as illustrated, much greater in the immediate proximity of the point source due not only to the distance between the source 26 and the cylinder 28, but also the angle of incidence upon the cylinder 28 of the radiation from the source 26. The illumination intensity curve as a function of the distance from the source 26 is illustrated in FIG. 3 and is generally parabolic in nature due largely to the well known inverse square decrease in radiation intensity as a function of distance.

Figure 4:
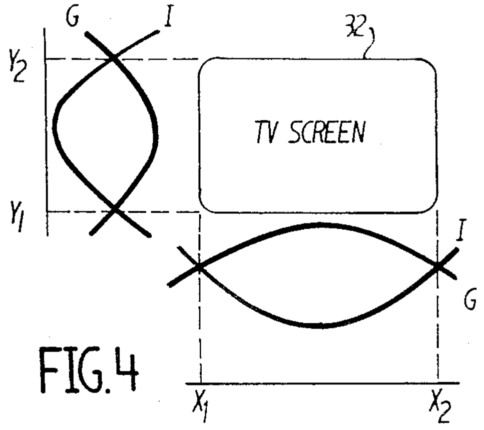
FIG. 4 is a schematic representation of the gain modification curves necessary to compensate for the intensity curves of FIG. 3.

As illustrated in FIG. 4 in proximity to the screen 32 of a suitable conventional television monitor, the intensity curve I varies in both the horizontal and vertical dimensions. To compensate for the variation in this intensity curve, it is desirable to modify the gain of the television system in accordance with gain curves G to produce an essentially flat or linear intensity picture between the extremes X1–X2 and Y1–Y2 of the scene.

Figure 5:
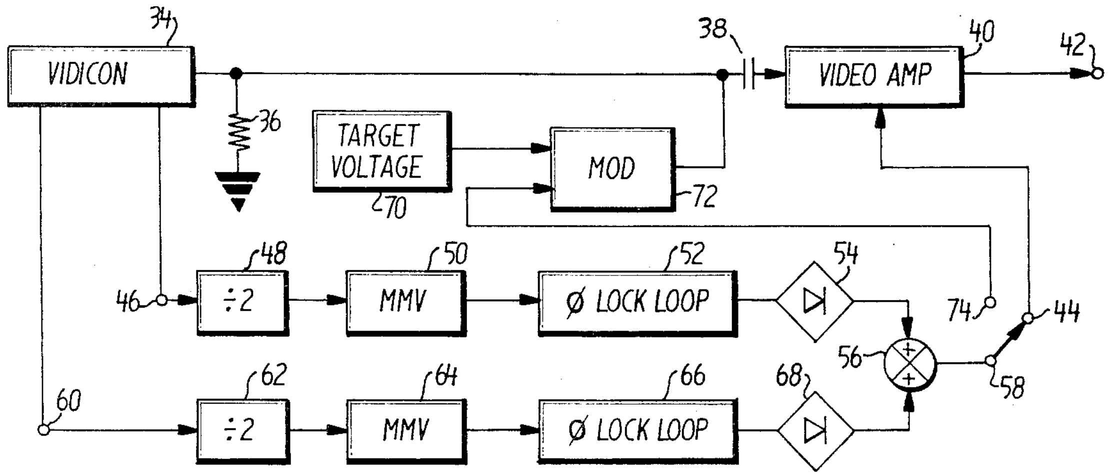
FIG. 5 is a functional block diagram of the present invention with selectively operable gain modification modes.

With reference now to FIG. 5, the output signal from a conventional vidicon 34 as developed across an input resistor 36 may be applied through a capacitor 38 to the video amplifier 34 and the output signal therefrom apply to the output terminal 42. The video amplifier may be controlled in accordance with the dc voltage level applied to a gain control terminal 44.

The gain control signal applied to the input terminal 44 of the video amplifier 40 may be developed in either of two ways. With continued reference to FIG. 5, the vidicon 34 may produce a horizontal sync pulse at the beginning of every line and a vertical sync pulse at the beginning of every frame. These signals are applied respectively to the input terminals 46 and 60. The vertical sync pulse applied to the input terminal 46 occurs at a frequency of 60 Hz. and may be applied through a conventional suitable divide-by-2 circuit 48 to the trigger input terminal of a conventional monostable or one shot multivibrator 50. The output signal from the true output terminal of the multivibrator 50 may be applied through a conventional phase lock loop 52 and a full wave rectifier 54 to a summing circuit 56 having an output terminal 58.

Likewise the horizontal sync pulse is derived from the vidicon 34 at a frequency of 15,750 Hz. This signal may be applied through a conventional divide-by-2 circuit 62 to the trigger input terminal of a suitable conventional monostable or one shot multivibrator 64. The output signal from the true output terminal of the multivibrator 64 may be applied through a suitable conventional phase lock loop 66 and a full wave rectifier 68 to the summing circuit 56 for combination with the output signal from the rectifier 54. The output signal from the summing circuit 56 may be applied to an output terminal 58 for selective connection to the gain control terminal 44 of the video amplifier 40.

Alternatively, the output signal from a target voltage generator 70 may be applied through a modulator 72 to the vidicon 34 wherein the modulating signal applied to the modulator 72 is derived from a terminal 74 of the switch further described.

In operation, the horizontal sync pulses are divided in frequency and converted to a predetermined fixed width series of pulses at a recurrence rate of 7,875 Hz. The series of pulses is converted in the phase lock loop through a sine wave of comparable frequency. The frequency of the sine wave is effectively doubled by the full wave rectification in producing a half sine wave voltage at 15,750 Hz. This wave shape is a very good approximation of the inverse parabolic wave shape of light intensity for which compensation is desired.

The vertical sync pulses are also divided in frequency in the divide-by-2 circuit for conversion to a series of constant width pulses at a frequency of 30 Hz. This 30 Hz. signal is converted in the phase lock loop to a 60 Hz. sine wave which is full wave rectified to produce a half sine wave signal at a 60 Hz. rate. This wave shape is also a good approximation of the inverse parabolic wave shape of the light intensity curve for which compensation is desired.

The vertical and horizontal half sine wave signals are combined in the voltage summing circuit 56 to provide a signal which varies in the both the vertical and horizontal directions with the illumination of the scene that may be applied to the switch from the terminal 58 to the gain control terminal 44 of the video amplifier 40.

Alternatively, the output signal of the target voltage generator 70 may be applied through a modulator directly to the vidicon 34. With the switch arm in the illustrated position, no input signal is applied to the modulation input terminal of the modulator 72 where the target voltage remains a constant. Target voltage is the bias utilized to accelerate the electrons of the cathode ray tube and is desirably a constant when the gain of the video amplifier is being modulated as explained above.

With, however, the switch arm connecting the terminal 58 to the input terminal 74 of the modulator, the composite compensation signal from the summing circuit 56 may be utilized to modulate the target voltage to thereby control the intensity gain of the circuit.

Inasmuch as the gain voltage generated also effects the light level compensation circuit (video automatic gain control of the camera), the modification of the signal from the target voltage generator has been found preferable to the application of a gain control signal to the amplifier 40.

The present invention may, however, be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a television inspection system for pipelines including a television monitor and a television camera remote from but electrically connected to said monitor and adapted for movement along the axis of the pipeline to be inspected, the improvement comprising means responsive to the horizontal and vertical sync signals of the camera for modifying the target voltage of the camera cathode ray tube in accordance with a predetermined pattern synchronized with the scan of the television camera.

2. The television inspection system of claim 1 wherein said target voltage modulation means includes phase locked loop means.

3. The television inspection system of claim 1 wherein said target voltage modulation is generally parabolic in both the horizontal and vertical planes.

4. The television inspection system of claim 1 wherein said amplitude modulation means includes:

means for converting the horizontal sync singal of the camera to a half sine wave signal of the same frequency and a predetermined phase relationship;

means for converting the vertical sync signal of the camera to a half sine wave signal of the same frequency and a predetermined phase relationship; and, means for combining said two half sine wave signals for application to the gain control terminal of the video amplifier of the camera.

5. A method of inspecting the interior walls of a right circular cylinder comprising the steps of traversing the right circular cylinder with a cathode ray tube coaxially disposed therein while electronically modifying the target voltage thereof in accordance with a predetermined pattern in both the horizontal and vertical directions to thereby increase the linearization of the video signal from the generator.

6. The method of claim 5 wherein the predetermined pattern is derived from the horizontal and vertical sync signals from the camera by the steps of:

a. providing first and second series of pulses equal respectively in recurrence rate to the horizontal and vertical sync signal;

b. providing third and fourth signals respectively responsive to the first and second series of pulses, said third and fourth signals being rectified sine waves; and, c. combining the third and fourth signals.

* * * * *